US012809762B2

(12) United States Patent
Shin et al.

(10) Patent No.: US 12,809,762 B2
(45) Date of Patent: Nov. 24, 2026

(54) MEMORY DEVICE AND METHOD OF OPERATING THE SAME

(71) Applicant: SK hynix Inc., Gyeonggi-do (KR)

(72) Inventors: Young Kyun Shin, Gyeonggi-do (KR); Seung Yun Lee, Gyeonggi-do (KR); Jeong Ho Yi, Gyeonggi-do (KR); Jung Hyun Joh, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/957,882

(22) Filed: Nov. 25, 2024

(65) Prior Publication Data

US 2025/0315371 A1 Oct. 9, 2025

(30) Foreign Application Priority Data

Apr. 5, 2024 (KR) ........................ 10-2024-0046653

(51) Int. Cl.
*G06F 12/02* (2006.01)

(52) U.S. Cl.
CPC ................................ *G06F 12/0223* (2013.01)

(58) Field of Classification Search
CPC ............ G11C 2207/2245; G11C 13/02; G11C 13/004; G11C 13/0004; G11C 13/0026; G11C 13/0028; G11C 13/0069; G06F 12/0223; G06F 12/0246; G06F 12/0659
See application file for complete search history.

(56) References Cited

U.S. PATENT DOCUMENTS

| | | | | |
|---|---|---|---|---|
| 9,613,676 B1 * | 4/2017 | Wang | .................. | G11C 11/2275 |
| 2012/0159072 A1 * | 6/2012 | Hida | .................. | G06F 12/0862<br>711/119 |
| 2019/0012264 A1 * | 1/2019 | Jeong | .................. | G06F 3/0658 |
| 2020/0050396 A1 * | 2/2020 | Keil | .................. | G06F 13/1621 |

FOREIGN PATENT DOCUMENTS

KR 10-2008-0099692 A 11/2008

* cited by examiner

*Primary Examiner* — Gary W. Cygiel
(74) *Attorney, Agent, or Firm* — IP & T GROUP LLP

(57) ABSTRACT

A memory device may include a bank including memory cells, a bank buffer connected to the memory cells of the bank through bit lines, and an operation controller. The operation controller may control the bank buffer to store a result of a read operation performed on memory cells corresponding to a first address in response to a first read command from an external controller, perform a write operation of storing data in memory cells corresponding to a second address in response to a write command from the external controller, the memory cells corresponding to the second address sharing bit lines with the memory cells corresponding to the first address, and control the bank buffer to provide, when the second address corresponding to a second read command after performing the write operation matches the first address, the stored result to the external controller as a response to the second read command.

18 Claims, 11 Drawing Sheets

A) Write Bias (Set)

B) Write Bias (Reset)

C) Read Bias

MEMORY DEVICE AND METHOD OF OPERATING THE SAME

CROSS-REFERENCE TO RELATED APPLICATION

The present application claims priority under 35 U.S.C. § 119 (a) to Korean patent application number 10-2024-0046653 filed on Apr. 5, 2024, the entire disclosure of which is incorporated by reference herein.

BACKGROUND

1. Field of Invention

Various embodiments of the present disclosure relate to a memory device and a method of operating the memory device.

2. Description of Related Art

Memory devices may include a volatile memory device in which stored data is lost when the supply of power is interrupted and a nonvolatile memory device in which stored data is retained even when the supply of power is interrupted. Each of memory cells included in a memory device may have a certain logic state depending on the physical/chemical characteristics of a material forming the memory cells included in the memory device. Memory cells containing a chalcogenide material may have the characteristics of operating slower than a dynamic random access memory (DRAM), but having capacity (integration) larger than that of the DRAM, and of having capacity (integration) smaller than that of a NAND flash memory, but operating faster than the NAND flash memory.

SUMMARY

Various embodiments of the present disclosure are directed to a memory device having improved lifetime, and a method of operating the memory device.

An embodiment of the present disclosure may provide for a memory device. The memory device may include a bank including memory cells, a bank buffer connected to the memory cells of the bank through bit lines, and an operation controller configured to control the bank buffer to store a result of a read operation performed on memory cells corresponding to a first address among the memory cells of the bank in response to a first read command input from an external controller, perform a write operation of storing data in memory cells corresponding to a second address among the memory cells of the bank in response to a write command received from the external controller, the memory cells corresponding to the second address sharing the bit lines with the memory cells corresponding to the first address, and control the bank buffer to provide, when an address corresponding to a second read command input from the external controller after performing the write operation matches the first address, the result of performing the read operation, stored in the bank buffer, to the external controller as a response to the second read command.

An embodiment of the present disclosure may provide for a memory device. The memory device may include a bank including memory cells each having one of a set state or a reset state, a word line controller configured to control a plurality of word lines connected to the memory cells of the bank, a bit line controller including a bank buffer connected to the memory cells of the bank through a plurality of bit lines, and an operation controller configured to control the memory cells of the bank, the word line controller, and the bit line controller in response to a command received from an external controller. The bank buffer may include a read 'buffer including read data latches connected to the plurality of bit lines, respectively, and a write buffer including write data latches connected to the plurality of bit lines in common with the read data latches.

An embodiment of the present disclosure may provide for a method of operating a memory device. The method may include receiving a first read command requesting data stored in memory cells corresponding to a first address among a plurality of memory cells included in the memory device, performing a read operation of sensing the data stored in the memory cells corresponding to the first address in response to the first read command, receiving a write command instructing data to be stored in memory cells corresponding to a second address among memory cells sharing a bit line with the memory cells corresponding to the first address, performing a write operation of storing the data in the memory cells corresponding to the second address in response to the write command, receiving a second read command requesting the data stored in the memory cells corresponding to the first address after performing the write operation, and outputting, in response to the second read command, a result of the read operation performed in response to the first read command as a response to the second read command.

DETAILED DESCRIPTION

Specific structural or functional descriptions in the embodiments of the present disclosure introduced in this specification are provided as examples to describe embodiments according to the concept of the present disclosure. The embodiments according to the concept of the present disclosure may be practiced in various forms, and should not be construed as being limited to the embodiments described in this specification.

Hereinafter, various embodiments of the present disclosure will be described in detail with reference to the accompanying drawings in which embodiments of the present disclosure are shown so that those skilled in the art to which the present disclosure pertains can easily practice the technical spirit of the present disclosure.

Figure 1:
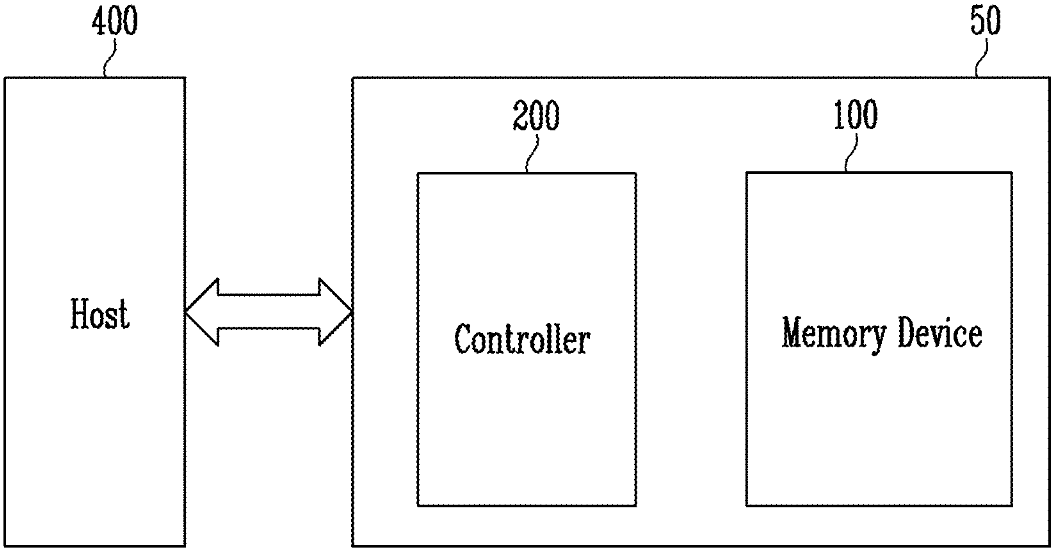
FIG. 1 is a diagram for describing a data storage device including a memory device according to an embodiment of the present disclosure.

FIG. 1 is a diagram for describing a data storage device including a memory device according to an embodiment of the present disclosure.

Referring to FIG. 1, a data storage device 50 may include a memory device 100 and a controller 200. The data storage device 50 may be a device which stores data under the control of a host 400, such as a mobile phone, a smartphone, a laptop computer, a desktop computer, a game console, a smart television (TV), a tablet PC, or an in-vehicle infotainment system. In an embodiment, the data storage device 50 may be a device which stores data at a remote place, such as a server or a data center, and which is controlled by the host 400 through wired/wireless communication.

The data storage device 50 may interface with the host 400 through various communication methods, and may be implemented as various devices depending on the interfacing methods. For example, the data storage device 50 may be implemented as any of various types of storage devices, such as a solid state drive (SSD), an embedded multimedia card (eMMC), a SD, mini-SD, or micro-SD-type secure digital card, a universal serial bus (USB) storage device, a universal flash storage (UFS) device, a personal computer memory card international association (PCMCIA) card-type storage device, a peripheral component interconnection (PCI) card-type storage device, a PCI express (PCI-E) card-type storage device, a compact flash (CF) card, and a smart media card.

In an embodiment, the data storage device 50 may be manufactured in any of various types of package forms. For example, the data storage device 50 may be manufactured in any of various types of package forms, such as package on package (POP), system in package (SIP), system on chip (SOC), multi-chip package (MCP), chip on board (COB), wafer-level fabricated package (WFP), and wafer-level stack package (WSP).

The memory device 100 may store data. The memory device 100 may be operated in response to the control of the controller 200. The memory device 100 may include a plurality of memory cells which store data.

Each of the memory cells may store one data bit or a plurality of data bits.

The memory cells may be accessed in units of a preset size depending on the type of memory device. The units in which the memory cells are accessed may differ for respective operations. For example, the memory cells may be accessed in different size units for a write operation of storing data in each memory cell, a read operation of sensing data stored in each memory cell, and an erase operation of erasing data stored in each memory cell.

In an embodiment, the memory device 100 may be a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus DRAM (RDRAM), a NAND flash memory, a vertical NAND flash memory, a NOR flash memory, a resistive RAM (RRAM), a phase-change memory (PCM), a magnetoresistive RAM (MRAM), a ferroelectric RAM (FRAM), or a spin transfer torque RAM (STT-RAM).

Generally, the memory cells included in the memory device 100 form an array, which includes a memory cell which stores data and a selector which selects the memory cell.

In DRAM, a capacitor functions as a memory cell, and a transistor functions as a selector. In the case of a NAND flash memory device, a transistor which selects memory cells in units of a string functions as a selector.

The memory device 100 may include single cells, each including a chalcogenide-based material and two electrodes. In an embodiment, in the memory device 100, the chalcogenide-based material may also be referred to as a dual function material (DFM). The DFM may have a threshold voltage, as in the case of an ovonic threshold switching (OTS) material functioning as a selector in a phase-change memory (PCM).

The DFM is different from the OTS, the threshold voltage of which does not change, and the threshold voltage of the DFS may change during a bidirectional write operation. Such a change allows the DFM to be used as a memory cell, and the DFM may function as both a memory cell and a selector through the bidirectional write operation. A memory device using the DFM may be a selector-only memory (SOM) device or a self-selecting memory (SSM) device.

In the present specification, description will be made based on that the memory device 100 is a type of phase-change memory including an SOM cell that is a memory cell containing the chalcogenide-based material.

The memory device 100 may receive a command and an address from the controller 200, and may access the area of the memory cell array, selected by the address. The memory device 100 may perform an operation indicated by the command on the area selected by the address. For example, the memory device 100 may perform a write operation (program operation), a read operation, and an erase operation. During a program operation, the memory device 100 may write data to the area selected by the address. During a read operation, the memory device 100 may sense data from the area selected by the address. During an erase operation, the memory device 100 may erase data stored in the area selected by the address.

The controller 200 may control the overall operation of the data storage device 50.

When power is applied to the data storage device 50, the controller 200 may run firmware (FW). The data storage device 50 may translate the address provided by the host 400 into an address used by the memory device 100.

The controller 200 may control the memory device 100 so that a write operation, a read operation or an erase operation is performed in response to a request received from the host 400. During the write operation, the controller 200 may provide a write command, an address, and data to the memory device 100. During the read operation, the controller 200 may provide a read command and an address to the memory device 100. During the erase operation, the controller 200 may provide an erase command and an address to the memory device 100.

In an embodiment, the controller 200 may independently generate a command, an address, and data regardless of whether a request from the host 400 is received, and may transmit them to the memory device 100. For example, the controller 200 may control the memory device 100 to perform various background operations for maintaining the performance of the memory device 100.

In an embodiment, the controller 200 may include an error correction code (ECC) processor. Alternatively, the ECC processor may be included, as a chip or a device separate from the controller 200, in the data storage device 50. The ECC processor may detect and correct errors contained in data obtained from the memory device 100 through a read operation. In an embodiment, the number of bits that can be corrected by the ECC processor may be limited.

Figure 2:
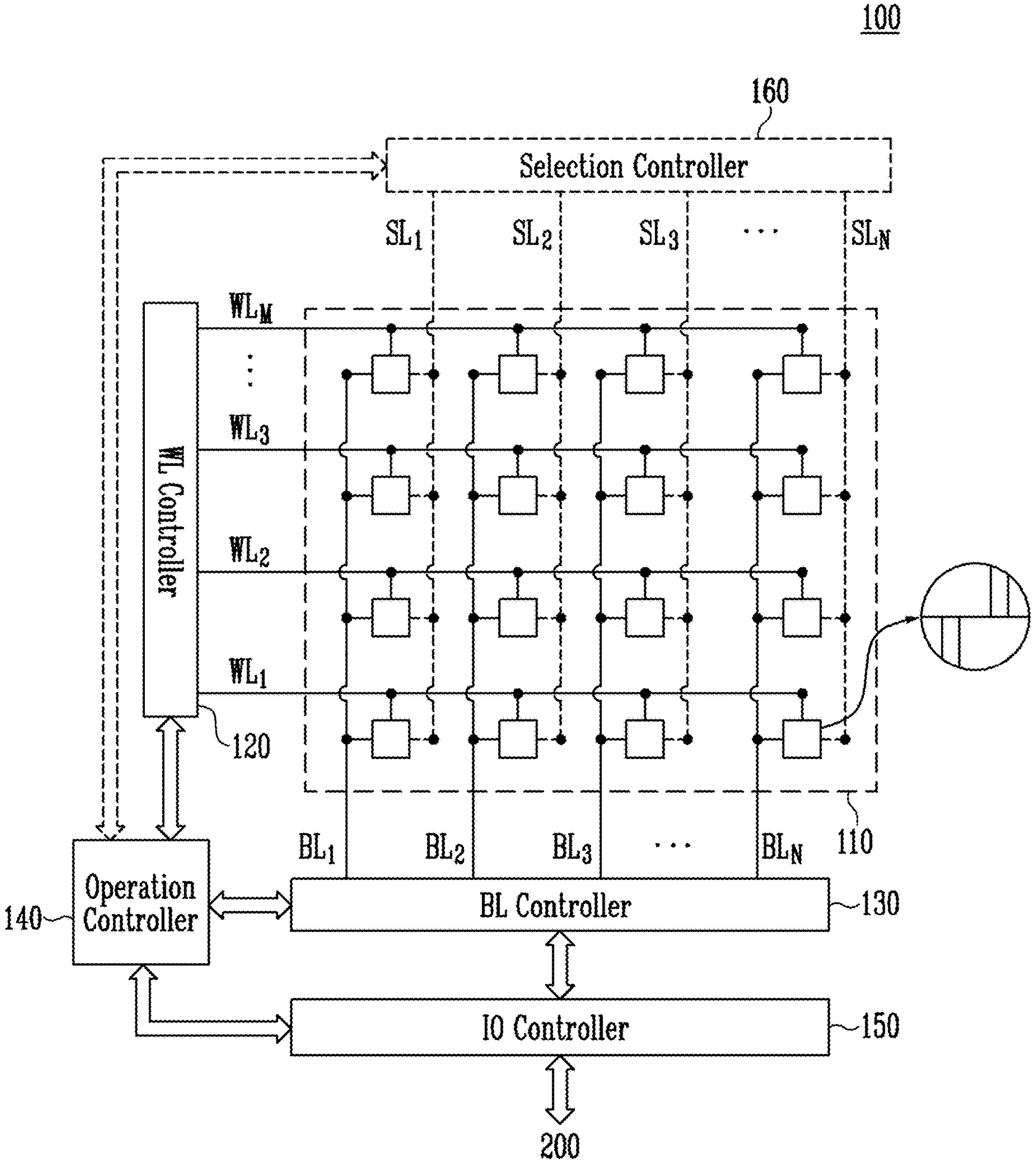
FIG. 2 is a diagram for describing a memory device of FIG. 1, according to an embodiment of the present disclosure.

FIG. 2 is a diagram for describing the memory device of FIG. 1, according to an embodiment of the present disclosure.

Referring to FIG. 2, the memory device 100 may include a memory cell array 110, a word line controller 120, a bit line controller 130, an operation controller 140, and an input/output (IO) controller 150. According to an embodiment, the memory device 100 may include a selection controller 160.

The memory cell array 110 may include memory cells arranged at intersections of a plurality of word lines and a plurality of bit lines. Each memory cell may be connected to one word line and one bit line. In an embodiment, each memory cell may contain a chalcogenide-based dual function material (DFM). The memory cell may store a logic state depending on the physical/chemical characteristics or attributes of the DFM.

In an embodiment, the memory cell may be a SOM cell or a self-selecting memory (SSM) cell.

The memory cell may be in a state corresponding to one of a set state or a reset state. The set state and the reset state may have opposite polarities.

In an embodiment, the set state may represent logic “0”, and the reset state may represent logic “1”. Alternatively, on the contrary, the set state may represent logic “1”, and the reset state may represent logic “0”.

The logic state of the memory cell may be detected by a read operation. The logic state of the memory cell may be based on the polarity of voltage applied to a DFM forming the memory cell. In an embodiment, the logic state of the memory cell may be at least partially based on the direction of current applied to the memory cell or the polarity of voltage applied thereto during a write operation.

In the present specification, for convenience of description, the set state may be defined as a logic “1” state in which data “1” is stored, and the reset state may be defined as a logic “0” state in which data “0” is stored.

In an embodiment, a memory cell in the set state may have a threshold voltage higher than that of a memory cell in the reset state.

The word line controller 120 may provide a word line voltage to memory cells included in the memory cell array 110 through a plurality of word lines $WL_1$ to $WL_M$ connected to the memory cells, respectively.

The bit line controller 130 may provide a bit line voltage to the memory cells included in the memory cell array 110 through a plurality of bit lines $BL_1$ to $BL_N$ connected to the memory cells, respectively.

In an embodiment, the bit line controller 130 may include a sense amplifier (Sense AMP) which senses pieces of data stored in the memory cells through the bit lines. Furthermore, the bit line controller 130 may include latches which store the sensed data.

The operation controller 140 may control the word line controller 120 and the bit line controller 130 so that an operation can be performed on the memory cell array. Each of the word line controller 120 and the bit line controller 130 may provide a voltage to the memory cell array under the control of the operation controller 140.

The IO controller 150 may perform data communication with the controller 200 described with reference to FIG. 1. In detail, IO controller 150 may receive a command, an address, or data from the controller 200, and transmit data stored in memory cells or an internal register to the controller 200.

The selection controller 160 may provide a control signal for selecting memory cells through select lines $SL_1$ to $SL_N$. In the case of a memory cell using the DFM, a separate control signal for the selection may not be needed, but according to an embodiment, the memory device 100 may be configured to provide a select signal for selecting a memory cell. The selection controller 160 may be omitted according to an embodiment.

Figure 3A:
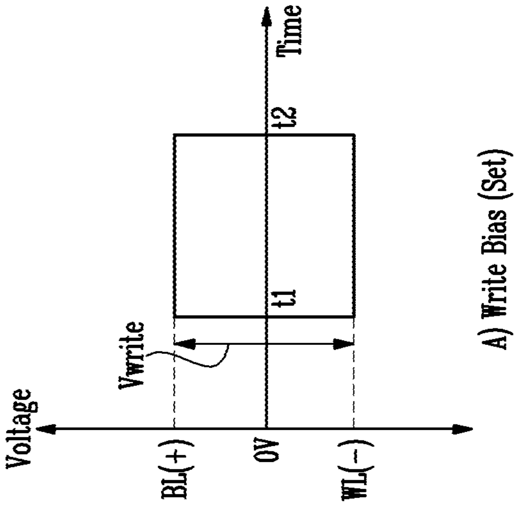
FIG. 3A, FIG. 3B and FIG. 3C are diagrams for describing voltages applied during a write operation and a read operation of the memory device, according to an embodiment of the present disclosure.
Figure 3B:
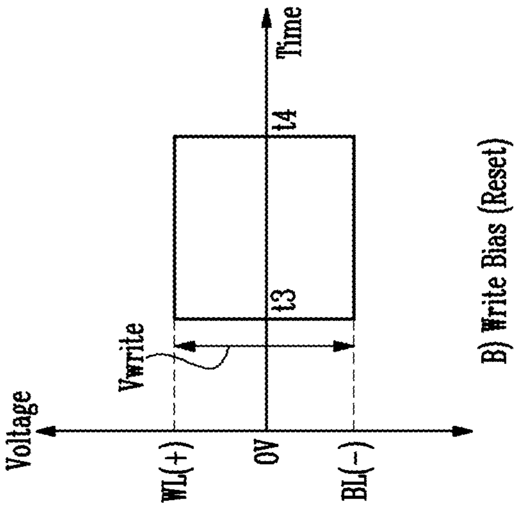
Figure 3C:
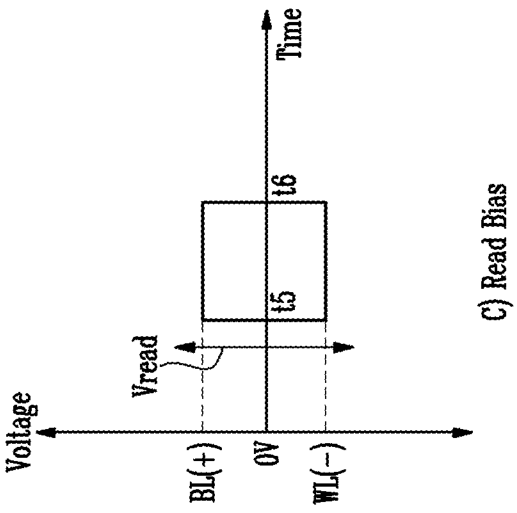

FIG. 3A, FIG. 3B and FIG. 3C are diagrams for describing voltages applied during a write operation and a read operation of the memory device, according to an embodiment of the present disclosure.

FIG. 3A is a diagram illustrating voltages applied to a word line and a bit line connected to each memory cell during a write operation for writing a set state. FIG. 3B is a diagram illustrating voltages applied to the word line and the bit line connected to the memory cell during a write operation for writing a reset state. FIG. 3C is a diagram illustrating voltages applied to the word line and the bit line connected to the memory cell during a read operation of sensing the writing state of the memory cell, namely, reading data stored in the memory cell.

To write the set state (i.e., to write data “0”) to the memory cell, the operation controller 140 described with reference to FIG. 2 may control the bit line controller 130 and the word line controller 120, respectively, to apply a positive voltage to the bit line and apply a negative voltage to the word line during a period t1 to t2. Here, a potential applied between the bit line and the word line may be a write voltage Vwrite. The write voltage Vwrite may have a voltage level capable of turning on the memory cell.

To write the reset state (i.e., to write data “1”) to the memory cell, the operation controller 140 described with reference to FIG. 2 may control the bit line controller 130 and the word line controller 120, respectively, to apply a negative voltage to the bit line and apply a positive voltage to the word line during a period t3 to t4. Here, a potential applied between the bit line and the word line may be a write voltage Vwrite. The write voltage Vwrite may have a voltage level capable of turning on the memory cell.

In an embodiment, voltages applied to the word line and the bit line so as to write the set state to the memory cell and voltages applied to the word line and the bit line so as to write the reset state to the memory cell may have the same magnitude and different polarities.

During a read operation, the operation controller 140 described with reference to FIG. 2 may apply the same voltage regardless of the logic state of the memory cell. In detail, the operation controller 140 may control the bit line controller 130 and the word line controller 120, respectively, to apply a negative voltage to the bit line and apply a positive voltage to the word line during a period t5 to t6. A read voltage Vread, which is a voltage applied during a read operation, may have a voltage level lower than that of the write voltage Vwrite. The following Table 1 shows sensed results based on the polarities of read voltages Vread applied during the read operation and the logic state of the memory cell.

TABLE 1

| Logic state of memory cell | Bit line voltage | Word line voltage | Sensed result |
|---|---|---|---|
| set state | + | − | On-cell |
| reset state | | | Off-cell |

After the read voltages are applied, the sense AMP included in the bit line controller 130 may sense the status of the memory cell. When the memory cell is in a set state, the result of sensing the memory cell may indicate that the memory cell is detected as an on-cell as a result of performing the read operation. The memory cell that is the on-cell indicates that it is turned on depending on the read voltages, and may be identified as the state of logic "1". When the memory cell is in a reset state, the result of sensing the memory cell may indicate that the memory cell is detected as an off-cell as a result of performing the read operation. The memory cell that is the off-cell indicates that it is turned off depending on the read voltages, and may be identified as the state of logic "0".

Figure 4:
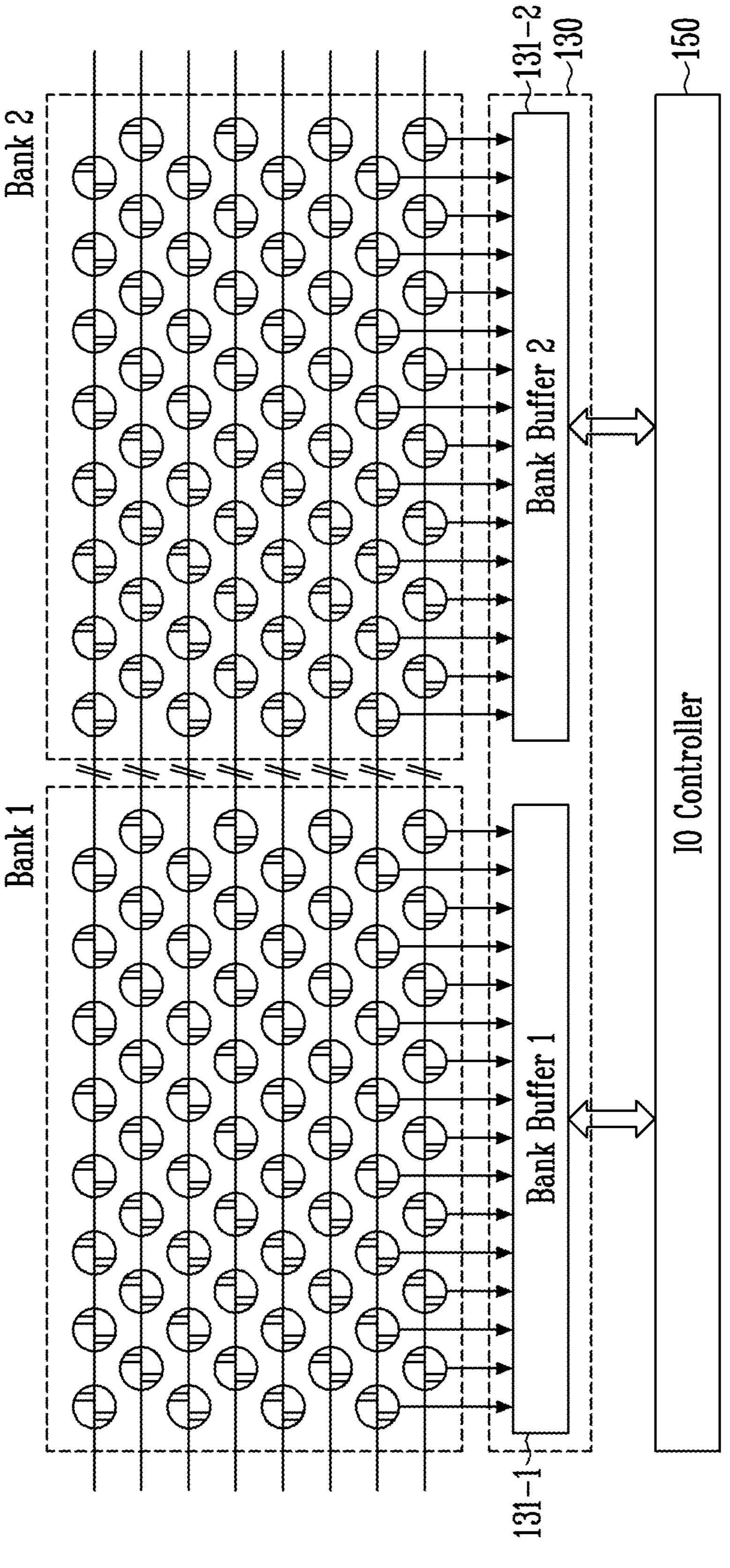
FIG. 4 is a diagram for describing a data input/output method of the memory device, according to an embodiment of the present disclosure.

FIG. 4 is a diagram for describing a data input/output method of the memory device, according to an embodiment of the present disclosure.

Referring to FIG. 4, the memory cell array 110 included in the memory device 100 described with reference to FIG. 2 may include a first bank Bank 1 and a second bank Bank 2. Each bank may include a plurality of memory cells. The memory cell array 110 may be divided in units of banks. Although FIG. 4 shows that the memory cell array 110 is divided into two banks, the number of banks included in the memory device 100 may be two or more. For example, the memory device 100 may include a memory cell array 110 formed of four or eight banks.

Each bank may be a unit capable of performing an operation independently. Each bank may also be referred to as a plane. Here, the term "unit capable of performing an operation independently" may indicate a unit capable of simultaneously performing a write operation, a read operation, and an erase operation.

The bit line controller 130 may include bank buffers provided for each bank. In detail, the memory cells included in the first bank Bank 1 may be connected to a first bank buffer Bank Buffer 1 through the corresponding bit lines connected thereto. In the same manner, the memory cells included in the second bank Bank 2 may be connected to a second bank buffer Bank Buffer 2 through the corresponding bit lines connected thereto.

The memory cells connected to the first bank buffer Bank Buffer 1 and the memory cells connected to the second bank buffer Bank Buffer 2 may independently perform operations. For example, the memory cells connected to the first bank buffer Bank Buffer 1 may perform a write operation, and the memory cells connected to the second bank buffer Bank Buffer 2 may perform a read operation. Alternatively, even if the same type of operations is performed, the first bank buffer Bank Buffer 1 and the second bank buffer Bank Buffer 2 may respectively perform the operations on cells corresponding to different addresses.

Each of the first bank buffer Bank Buffer 1 and the second bank buffer Bank Buffer 2 may temporarily store data to be stored in a memory cell, or may temporarily store data sensed from a memory cell during a read operation. In detail, each of the first bank buffer Bank Buffer 1 and the second bank buffer Bank Buffer 2 may be connected to the corresponding memory cells through the bit lines, and may include a latch configured to latch data sensed from the connected memory cells or a latch configured to temporarily store data to be stored in the memory cells.

The I/O controller 150 may provide data received from the controller 200 described with reference to FIG. 1 to the first bank buffer Bank Buffer 1 and the second bank buffer Bank Buffer 2. Alternatively, on the contrary, the I/O controller 150 may transmit data received from the first bank buffer Bank Buffer 1 and the second bank buffer Bank Buffer 2 to the controller 200.

In the same way that the first bank buffer Bank Buffer 1 131-1 and the second bank buffer Bank Buffer 2 131-2 independently operate, the I/O controller 150 may provide data received from the second bank buffer Bank Buffer 2 to the controller 200 while providing data to the first bank buffer Bank Buffer 1. Alternatively, on the contrary, the I/O controller 150 may provide data received from the first bank buffer Bank Buffer 1 to the controller 200 while providing data to the second bank buffer Bank Buffer 2.

Figure 5:
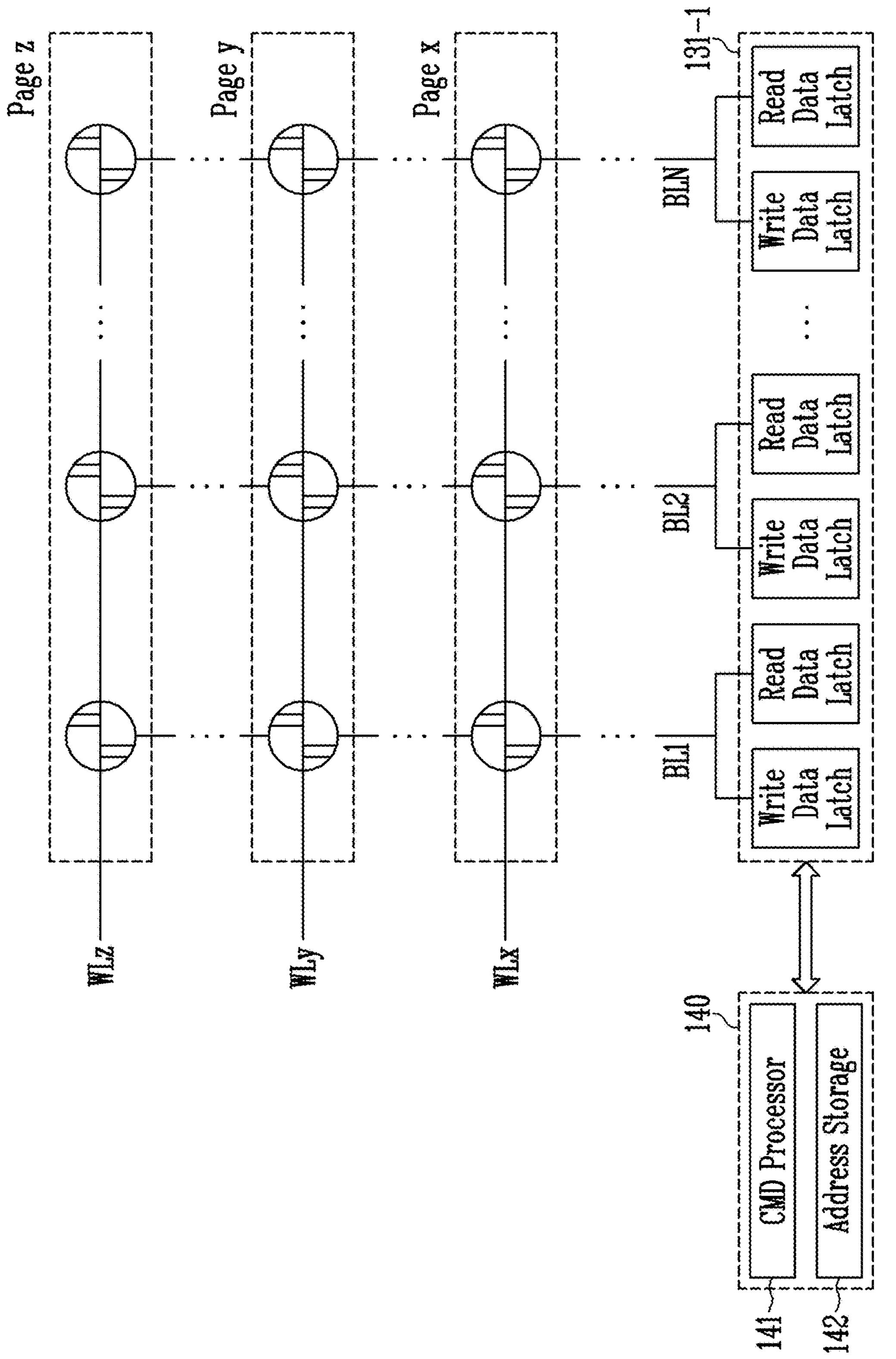
FIG. 5 is a diagram for describing operation principles of a bank buffer and an operation controller, according to an embodiment of the present disclosure.

FIG. 5 is a diagram for describing operation principles of the bank buffer and the operation controller, according to an embodiment of the present disclosure.

Referring to FIGS. 2, 4, and 5, an x-th word line, a y-th word line, and a z-th word line may each be connected to corresponding memory cells included in the first bank. Memory cells connected to the same word line may form one page. Both a write operation of storing data in memory cells and a read operation of sensing (obtaining) data stored in memory cells may be performed in units of a page.

Memory cells connected to different word lines may be connected in common to the same bit line. Therefore, when one page is selected and a write operation or a read operation is performed on the page, another page cannot be simultaneously selected or an operation cannot be performed thereon.

The first bank buffer 131-1 may include a plurality of write data latches Write Data Latch and a plurality of read data latches Read Data Latch. Each bit line may be connected in common to one corresponding write data latch Write Data Latch and one corresponding read data latch Read Data Latch. During a write operation of storing data in memory cells connected to the bit line, the write data latches Write Data Latch may be used. During a read operation of sensing data stored in the memory cells, the read data latches Read Data Latch may be used.

In detail, during a write operation, based on data stored in the plurality of write data latches Write Data Latch, each of the memory cells may be written to have one state of a set state or a reset state. During a read operation, based on voltages applied to a word line and the bit lines, data sensed from the corresponding memory cells may be stored in the plurality of read data latches Read Data Latch.

Since an operation cannot be performed on two or more pages at the same time, the plurality of write data latches Write Data Latch and the plurality of read data latches Read Data Latch included in the bank buffer may always have data to be stored during the last write operation and result data of the last read operation.

A memory cell including a chalcogenide-based DFM according to an embodiment of the present disclosure may have vulnerabilities related to reliability such as cycling endurance, read disturbance, drift, retention, and the like. Particularly, unlike other memory elements, in the case of the memory cell including the chalcogenide-based DFM, read stress influences the lifetime of the memory cell rather than the integrity of data. That is, the number of times read operations can be performed may be limited.

In more detail, in both the set state and the reset state, the number of times read operations can be performed in the lifetime of the memory device may be limited. Particularly, in the case of the reset state, as a time tRC between read operations performed on the same memory cell is shorter, stress caused by the influence of the read disturbance may increase.

Therefore, an algorithm is needed to prevent read operations on the same memory cell from being repeatedly performed within a short time.

The operation controller 140 may include a command processor 141 and an address storage 142.

The command processor 141 may receive a command from an external controller (e.g., the controller 200), and may control the overall operation of the memory device 100 to perform the command.

In an embodiment, the command processor 141 may determine whether the command received from the external controller is a read command. When the command received from the external controller is a write command, write data received along with the write command may be stored in the write data latches Write Data Latch of the first bank buffer 131-1. Thereafter, the command processor 141 may perform the write operation such that write target memory cells have one of the set state or the reset state based on data stored in the write data latches Write Data Latch.

When a received command is a read command, the command processor 141 may determine whether a read address received along with the read command is the same as an address stored in the address storage 142.

When the received read address differs from the address stored in the address storage 142, a read operation of sensing data stored in memory cells corresponding to the received read address may be performed.

If the read operation is performed, data stored in the memory cells corresponding to the received read address may be stored in the read data latches Read Data Latch. When the read operation is completed, the command processor 141 may store the address for which the read operation has been performed in the address storage 142. Therefore, the address of the completed read operation may be stored in the address storage 142. The read data latches Read Data Latch may retain the data sensed from the address stored in the address storage 142.

When a received read address is the same as the address stored in the address storage 142, the result of the previously performed read operation may be used. In this case, the command processor 141 may provide the data already stored in the read data latches Read Data Latch as a response to the received read command without performing a read operation.

In various embodiments, even during a write operation rather than a read operation, the command processor 141 may store the address for which the write operation has been performed in the address storage 142. Therefore, the address of the completed write operation may be stored in the address storage 142. The write data latches Write Data Latch may retain data stored in memory cells corresponding to the address for which the write operation has been performed.

If, after the write operation is performed, a read command for the same address is received, the data received during the previously performed write operation may be used. In this case, the command processor 141 may provide the data already stored in the write data latches Write Data Latch as a response to the received read command without performing a read operation.

Figure 6:
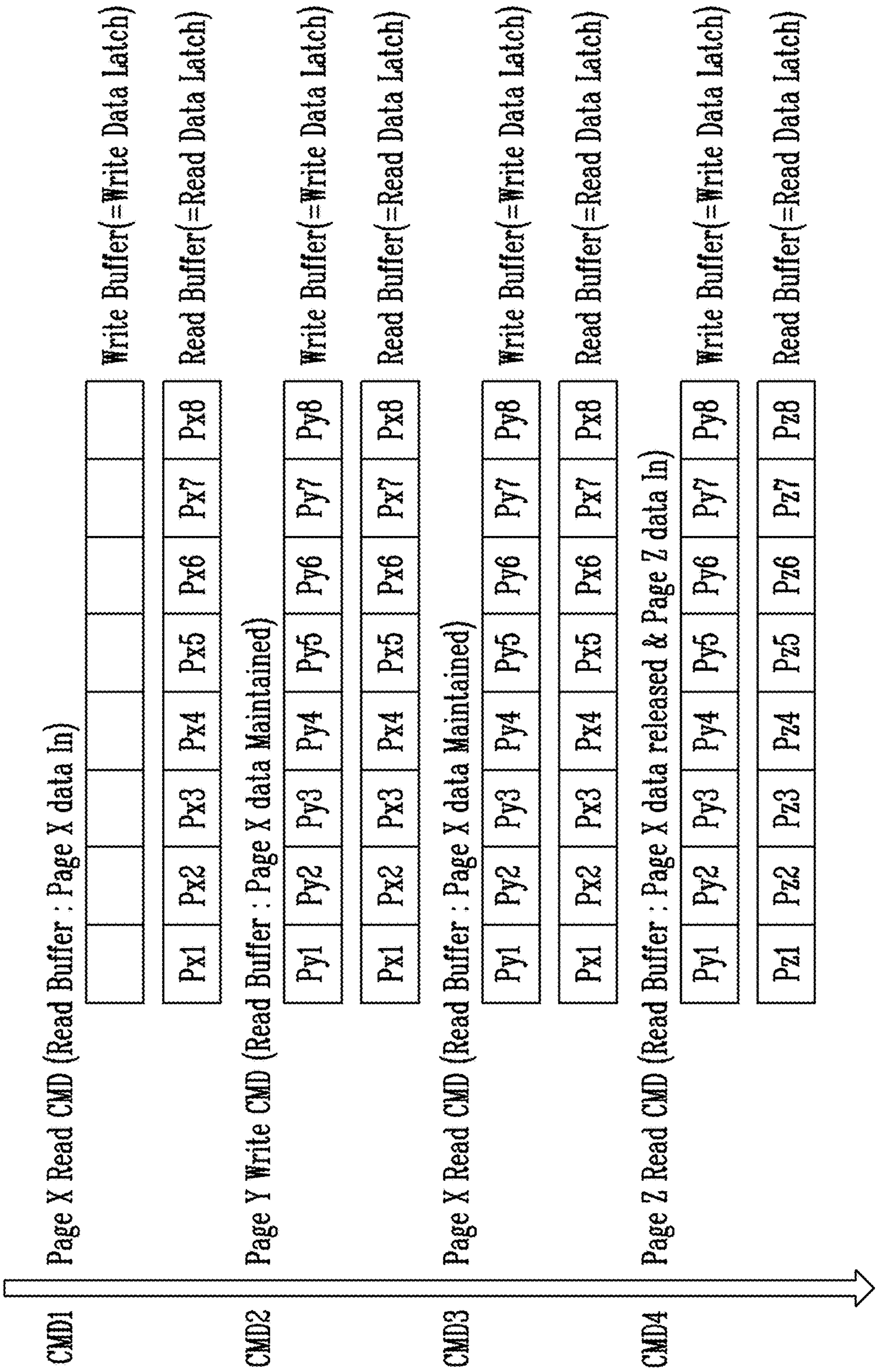
FIG. 6 is a diagram for describing a read operation according to an embodiment to the present disclosure.

FIG. 6 is a diagram for describing a read operation according to an embodiment of the present disclosure.

Referring to FIG. 6, illustrated are a sequence of commands received from the controller and data stored in a read buffer and a write buffer included in the bank buffer when each command is performed. The write buffer may include write data latches Write Data Latch connected to the respective bit lines. The read buffer may include read data latches Read Data Latch connected to the respective bit lines.

In FIG. 6, the memory device receives commands from an external controller (e.g., the controller 200) in a sequence of a first command CMD1, a second command CMD2, a third command CMD3, and a fourth command CMD4, and page X, page Y, and page Z all belong to the same bank. That is, memory cells belonging to page X, page Y, and page Z are respectively connected to different word lines. Furthermore, some of the memory cells belonging to page X, page Y, and page Z may be connected in common to the same bit lines, thus sharing the write buffer and the read buffer.

The first command CMD1 may be a read command requesting data stored in page X. In this case, the write buffer may be empty, and page X data Px1 to Px8, which is a result of sensing data stored in page X, may be stored in the read buffer. The memory device may store an address for page X on which the read operation has been completed.

The second command CMD2 may be a write command instructing data to be stored in page Y.

The bank buffer may include the write buffer and the read buffer that are separately provided. During a write operation, data stored in the read buffer may be maintained. During a read operation, data stored in the write buffer may be maintained. Therefore, the page X data Px1 to Px8 that is the data of page X on which the read operation has been performed in response to the first command CMD1 may remain stored in the read buffer.

Page Y data Py1 to Py8, which is data to be stored in page Y in response to the second command CMD2, may be stored in the write buffer. Depending on the stored data, the logic state of the memory cells included in page Y, which are write target memory cells, may be determined. The memory device may perform the write operation on page Y.

The third command CMD3 may be a read command requesting data stored in page X. The memory device may check that the third command CMD3 that is input is not a write command, but a read command for the same address as page X that is an address for which the previous read operation has been completed. The memory device may provide the page X data Px1 to PX8 stored in the read buffer as a response to the third command CMD3 rather than performing a read operation on page X in response to the third command CMD3. Since the third command CMD3 is a read command, the page Y data Py1 to Py8 stored in the write buffer may be maintained.

The fourth command CMD4 may be a read command requesting data stored in page Z.

The memory device may check that the fourth command CMD4 that is input is not a write command, but a read command for page Z different from page X corresponding to the address for which the previous read operation has been completed. The memory device may discard the page X data Px1 to Px8 that has been stored in the read buffer so as to perform a read operation on page Z (refer to "Page X data released" in FIG. 6). Thereafter, the memory device may perform a read operation on page Z, and page Z data Pz1 to Pz8 may be stored in the read buffer as a result of sensing data stored in page Z. The memory device may store an address for page Z on which the read operation has been completed. Since the fourth command CMD4 is a read command, the page Y data Py1 to Py8 stored in the write buffer may be maintained.

Figure 7:
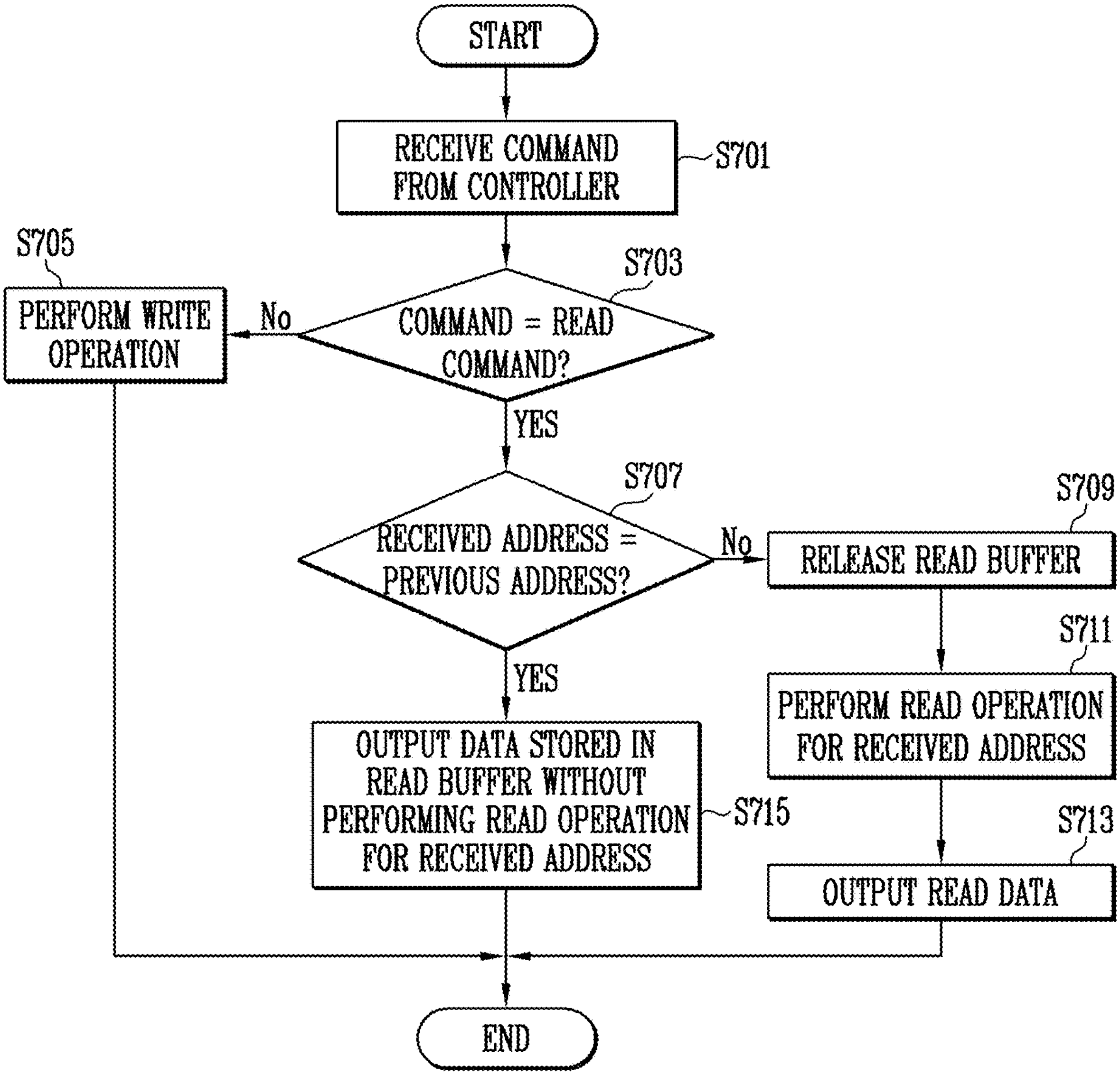
FIG. 7 is a flowchart for describing a method of operating the memory device according to an embodiment of the present disclosure.

FIG. 7 is a flowchart for describing a method of operating the memory device according to an embodiment of the present disclosure.

Referring to FIG. 7, at operation S701, the memory device may receive a command from the controller.

At operation S703, the memory device may determine whether the received command is a read command. When the received command is a read command, the memory device may proceed to operation S707, and when it is a write command rather than a read command, the memory device may proceed to operation S705.

At operation S705, the memory device may perform a write operation in response to the received write command. In detail, the memory device may store write data input along with the write command in the write buffer included in the bank buffer. The write buffer may include the write data latches Write Data Latch connected to the respective bit lines. Depending on data stored in the write data latches Write Data Latch, the logic state of write target memory cells may be determined. The memory device may perform a write operation of writing the determined logic state of the write target memory cells.

At the operation S707, the memory device may determine whether an address received along with the input read command is the same as an address for which a previous read operation has been performed. When it is determined that the received address is not the same as the previous address, the memory device may perform operations S709 to S713. When it is determined that the received address is the same as the previous address, the memory device may proceed to operation S715.

At the operation S709, the memory device may release the read buffer. In detail, the memory device may discard (or release) the data stored in the read buffer included in the bank buffer. The read buffer may include the read data latches Read Data Latch connected to the respective bit lines.

At the operation S711, the memory device may perform a read operation for the received address. A negative voltage and positive voltages may be respectively applied to a word line and bit lines connected to memory cells corresponding to the received address. When a read voltage is applied, the logic state of the memory cells may be stored in the read data latches Read Data Latch through the bit lines respectively connected to the memory cells.

At the operation S713, the memory device may output read data stored in the read data latches Read Data Latch to the data controller.

At the operation S715, the memory device may not perform a read operation for the received address. That is, the result of performing the read operation on the data stored in the memory cells corresponding to the previous address may have been stored in the read data latches Read Data Latch. Therefore, the memory device may output a response to the read command by intactly outputting the data stored in the read data latches Read Data Latch without performing a read operation.

Figure 8:
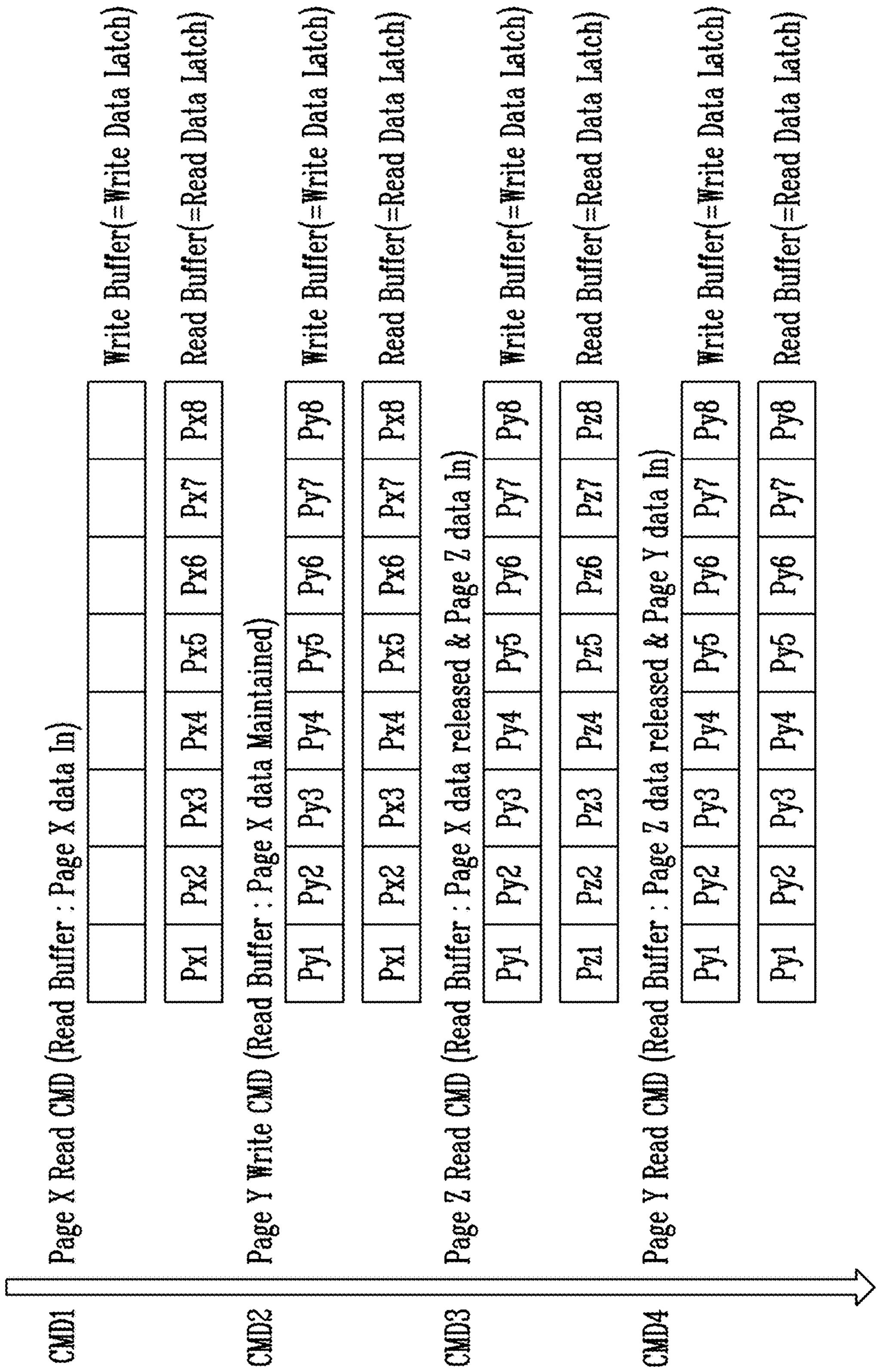
FIG. 8 is a diagram for describing a read operation according to an embodiment of the present disclosure.

FIG. 8 is a diagram for describing a read operation according to an embodiment of the present disclosure.

Referring to FIG. 8, illustrated are a sequence of commands received from the controller and data stored in the read buffer and the write buffer included in the bank buffer when each command is performed. The write buffer may include write data latches Write Data Latch connected to the respective bit lines. The read buffer may include read data latches Read Data Latch connected to the respective bit lines.

In FIG. 8, the memory device receives commands from an external controller (e.g., the controller 200) in a sequence of a first command CMD1, a second command CMD2, a third command CMD3, and a fourth command CMD4, and page X, page Y, and page Z all belong to the same bank. That is, memory cells belonging to page X, page Y, and page Z are respectively connected to different word lines. Furthermore, some of the memory cells belonging to page X, page Y, and page Z may be connected in common to the same bit lines, thus sharing the write buffer and the read buffer.

The first command CMD1 may be a read command requesting data stored in page X. In this case, the write buffer may be empty, and page X data Px1 to Px8, which is a result of sensing data stored in page X, may be stored in the read buffer. The memory device may store an address for page X on which a read operation is completed.

The second command CMD2 may be a write command instructing data to be stored in page Y.

The bank buffer may include the write buffer and the read buffer that are separately provided. During a write operation, data stored in the read buffer may be maintained. During a read operation, data stored in the write buffer may be maintained. Therefore, the page X data Px1 to Px8 that is the data of page X on which the read operation has been performed in response to the first command CMD1 may remain stored in the read buffer.

Page Y data Py1 to Py8, which is data to be stored in page Y in response to the second command CMD2, may be stored in the write buffer. Depending on the stored data, the logic state of the memory cells included in page Y, which are write target memory cells, may be determined. The memory device may perform the write operation on page Y. The memory device may store an address for page Y on which the write operation has been performed.

The third command CMD3 may be a read command requesting data stored in page Z. The memory device may check that the third command CMD3 that is input is not a write command, but a read command for an address different from that of page X that is an address for which the previous read operation has been completed. The memory device may discard the page X data Px1 to Px8 that has been stored in the read buffer so as to perform a read operation on page Z (refer to "Page X data released" in FIG. 8). Thereafter, the memory device may perform a read operation on page Z, and page Z data Pz1 to Pz8 may be stored in the read buffer as a result of sensing data stored in page Z. The memory device may store an address for page Z on which the read operation has been completed. The memory device may output the page Z data Pz1 to Pz8 in response to the third command CMD3. Since the third command CMD3 is a read command, the page Y data Py1 to Py8 stored in the write buffer may be maintained.

The fourth command CMD4 may be a read command requesting data stored in page Y.

The memory device may check that the fourth command CMD4 that is input is not a write command, but a read command for an address different from that of page Z that is an address for which the previous read operation has been completed. Furthermore, the memory device may check that page Y corresponds to an address for which the previous write operation has been performed. Accordingly, the memory device may recognize that the same data as the data stored in page Y is stored in the write buffer.

The memory device may discard the page Z data Pz1 to Pz8 stored in the read buffer (refer to "Page Z data released" in FIG. 8) so as to output the page Y data stored in the write buffer as a result of performing a read operation, without performing the read operation on page Y. Subsequently, the memory device may store, in the read buffer, the page Y data Py1 to Py8 stored in the write buffer.

According to the embodiment described with reference to FIG. 8, there is an effect where when a read command for the same address as the data stored in the write buffer as well as the read buffer is received, the data may be directly output without a read operation being performed.

Figure 9:
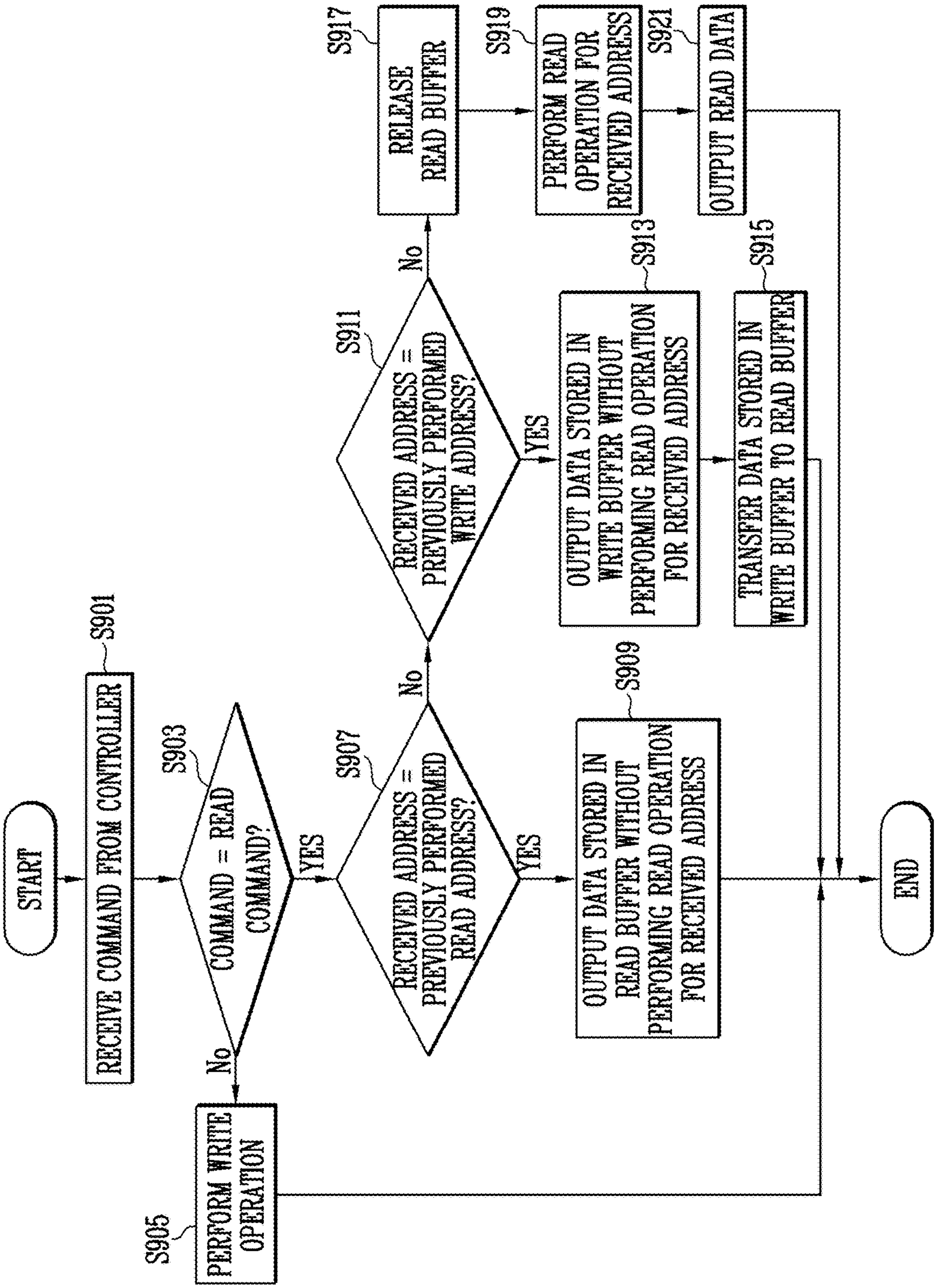
FIG. 9 is a flowchart for describing a method of operating the memory device according to an embodiment of the present disclosure.

FIG. 9 is a flowchart for describing a method of operating the memory device according to an embodiment of the present disclosure.

Referring to FIG. 9, at operation S901, the memory device may receive a command from the controller.

At operation S903, the memory device may determine whether the received command is a read command. When the received command is a read command, the memory device may proceed to operation S907, and when it is a write command rather than a read command, the memory device may proceed to operation S905.

At the operation S905, the memory device may perform a write operation in response to the received write command. In detail, the memory device may store write data input along with the write command in the write buffer included in the bank buffer. The write buffer may include the write data latches Write Data Latch connected to the respective bit lines. Depending on data stored in the write data latches Write Data Latch, the logic state of write target memory cells may be determined. The memory device may perform a write operation of writing the determined logic state of the write target memory cells.

At the operation S907, the memory device may determine whether an address received along with the input read command is the same as an address for which a previous read operation has been performed. When it is determined that the received address is not the same as the previous address, the memory device may proceed to operation S911. When it is determined that the received address is the same as the previous address, the memory device may proceed to operation S909.

At the operation S911, the memory device may determine whether an address received along with the input read command is the same as an address for which a previous write operation has been performed. When it is determined that the received address is not the same as the previous address, the memory device may proceed to operation S917. When it is determined that the received address is the same as the previous address, the memory device may proceed to operation S913.

At the operation S913, the memory device may not perform a read operation for the received address. That is, data used during the write operation of storing the data in the memory cells corresponding to the previous address may have been stored in the write data latches Write Data Latch. Therefore, the memory device may output a response to the read command by intactly outputting the data stored in the write data latches Write Data Latch without performing a read operation.

At operation S915, the memory device may transmit the data stored in the write buffer to the read buffer. The write buffer may include the write data latches Write Data Latch connected to the respective bit lines. The memory device may transmit the data stored in the write data latches Write Data Latch to the read data latches Read Data Latch, and store the received address.

At the operation S917, the memory device may release the read buffer. In detail, the memory device may discard (or release) the data stored in the read buffer included in the bank buffer. The read buffer may include the read data latches Read Data Latch connected to the respective bit lines.

At operation S919, the memory device may perform a read operation for the received address. A negative voltage and positive voltages may be respectively applied to a word line and bit lines connected to memory cells corresponding to the received address. When a read voltage is applied, the logic state of the memory cells may be stored in the read data latches Read Data Latch through the bit lines respectively connected to the memory cells.

At operation S921, the memory device may output read data stored in the read data latches Read Data Latch to the data controller, and store the received address.

In accordance with embodiments of the present disclosure described with reference to FIGS. 6 to 9, the memory device may not perform a repeated read operation for the same address. Particularly, even if a write operation for a different address belonging to the same bank is performed, when an address specified by a subsequently input read command is the same as an address of a previously performed read operation, a result of performing the read operation may have been stored in the read buffer included in the bank buffer. Furthermore, if a read command for an address at which a write operation has been performed is received without an additional write command being input for a different address after the write operation has been performed, data used during the write operation may still be maintained in the write buffer included in the bank buffer. Therefore, the memory device may reduce stress caused by repeatedly performing read operations on the same memory cell within a short time regardless of whether the memory cell is in the set state or the reset state. Accordingly, the lifetime of the memory device may be increased.

Figure 10:
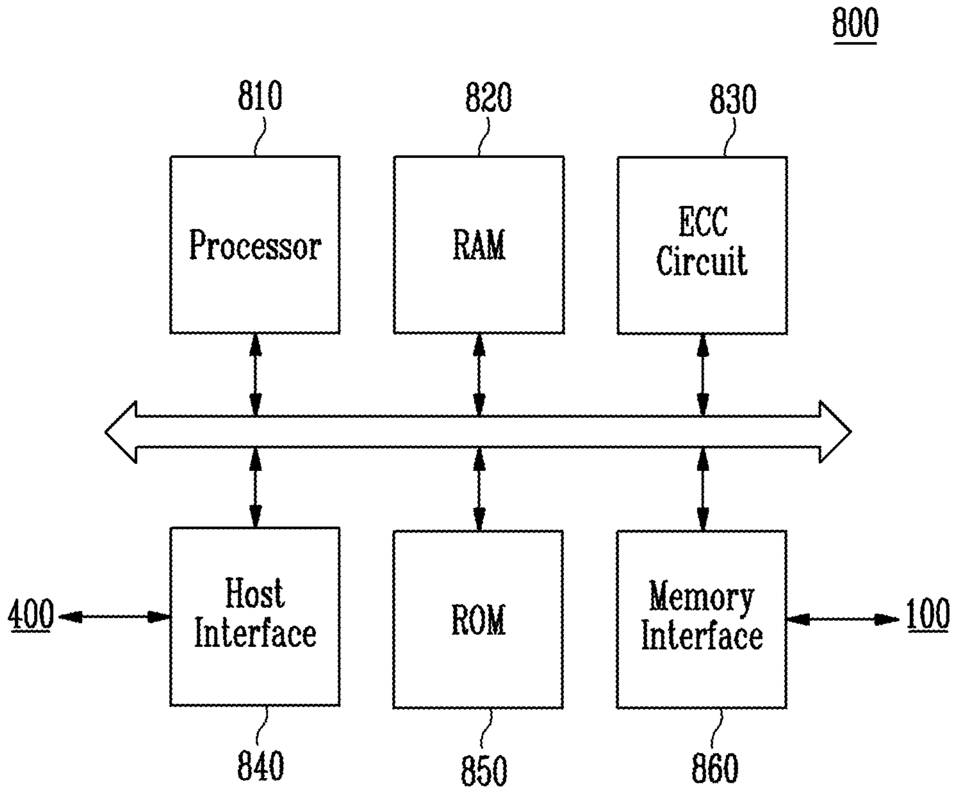
FIG. 10 is a diagram illustrating a controller, according to an embodiment of the present disclosure.

FIG. 10 is a diagram illustrating a controller, according to an embodiment of the present disclosure.

Referring to FIG. 10, a memory controller 800 may include a processor 810, a random access memory (RAM) 820, an error correction (ECC) circuit 830, a host interface 840, a read only memory (ROM) 850, and a memory interface 860. The memory controller 800 may correspond to the controller 200, described above with reference to FIG. 1.

The processor 810 may control the overall operation of the memory controller 800. The RAM 820 may be used as a buffer memory, a cache memory or a working memory of the memory controller 800.

The ROM 850 may store various types of information required for operating the memory controller 800 in the form of firmware.

The memory controller 800 may communicate with an external device (e.g., the host 400, an application processor or the like) through the host interface 840.

The memory controller 800 may communicate with the memory device 100 through the memory interface 860. The memory controller 800 may transmit a command CMD, an address ADDR, a control signal CTRL, or the like to the memory device 100 and receive data DATA from the memory device 100, through the memory interface 860.

Figure 11:
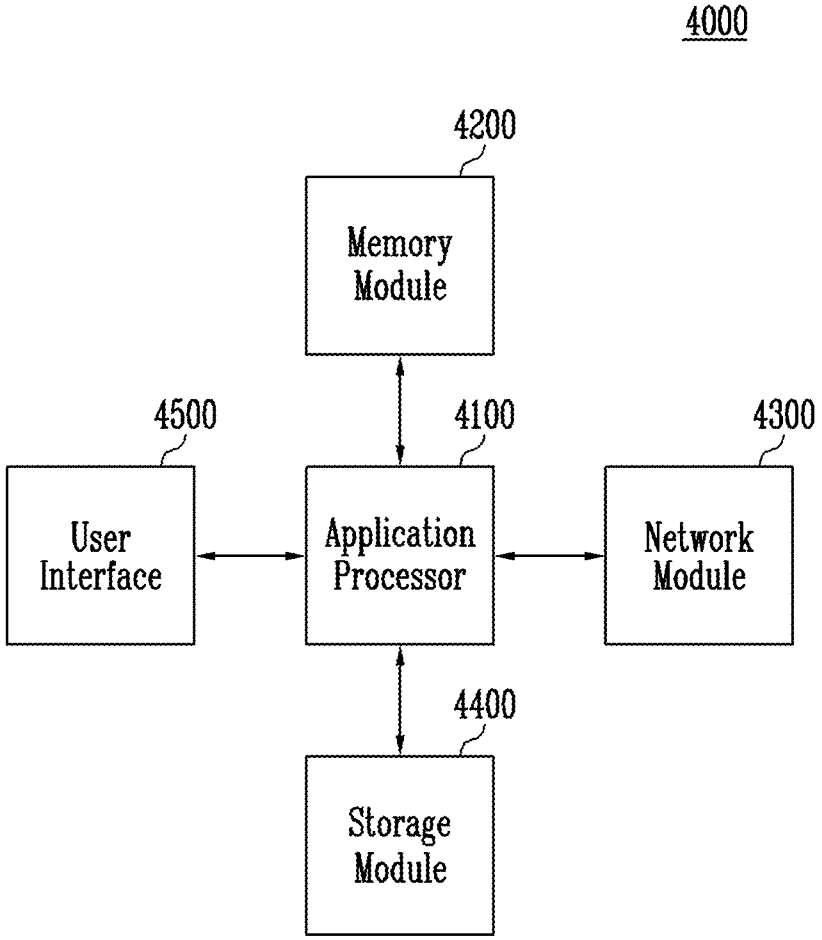
FIG. 11 is a block diagram illustrating a user system to which a data storage device according to an embodiment of the present disclosure is applied.

FIG. 11 is a block diagram illustrating a user system to which a data storage device according to an embodiment of the present disclosure is applied.

Referring to FIG. 11, a user system 4000 may include an application processor 4100, a memory module 4200, a network module 4300, a storage module 4400, and a user interface 4500.

The application processor 4100 may run components included in the user system 4000, an operating system (OS) or a user program. In an embodiment, the application processor 4100 may include controllers, interfaces, graphic engines, etc. for controlling the components included in the user system 4000. The application processor 4100 may be formed of a system-on-chip (SoC).

The memory module 4200 may function as a main memory, a working memory, a buffer memory, or a cache memory of the user system 4000. The memory module 4200 may include volatile RAMs such as DRAM, SDRAM, DDR SDRAM, DDR2 SDRAM, DDR3 SDRAM, LPDDR SDRAM, LPDDR2 SDRAM, and LPDDR3 SDRAM or nonvolatile RAMs such as PCM, ReRAM, MRAM, and FRAM. In an embodiment, the application processor 4100 and the memory module 4200 may be packaged based on a package-on-package (POP), and may then be provided as a single semiconductor package.

The network module 4300 may communicate with external devices. In an embodiment, the network module 4300 may support wireless communication, such as code division multiple access (CDMA), global system for mobile communication (GSM), wideband CDMA (WCDMA), CDMA-2000, time division multiple access (TDMA), long term evolution (LTE), WiMax, WLAN, UWB, Bluetooth, or Wi-Fi. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a phase-change RAM (PRAM), a magnetic RAM (MRAM), a resistive RAM (RRAM), a NAND flash memory, a NOR flash memory, or a NAND flash memory having a three-dimensional (3D) structure. In an embodiment, the storage module 4400 may correspond to the data storage device 50, described above with reference to FIG. 1. Alternatively, in various embodiments, the storage module 4400 may be provided as a removable storage medium (removable drive), such as a memory card or an external drive of the user system 4000.

In an embodiment, the storage module 4400 may include a plurality of nonvolatile memory devices, each of which may be operated in the same manner as the memory device 100, described above with reference to FIG. 1. The storage module 4400 may be operated in the same manner as the data storage device 50, described above with reference to FIG. 1.

The user interface 4500 may include interfaces which input data or instructions to the application processor 4100 or output data to external devices. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as an a liquid crystal display (LCD), an organic light emitting diode (OLED) display device, an active matrix OLED (AMOLED) display device, an LED, a speaker, and a monitor.

Embodiments of the present disclosure may provide a memory device having improved lifetime and a method of operating the memory device. Furthermore, the embodiments may be combined to form additional embodiments.

What is claimed is:

1. A memory device comprising:

a bank including memory cells;

a bank buffer connected to the memory cells of the bank through bit lines; and an operation controller configured to control the bank buffer in response to a command input from an external controller, wherein the bank buffer comprises:

a read buffer including read data latches connected to the bit lines, respectively; and a write buffer including write data latches connected to the bit lines in common with the read data latches, wherein the operation controller comprises a command processor configured to process the command received from the external controller;

wherein the command processor is configured to:

control the read buffer to store a result of a read operation performed on memory cells corresponding to a first address among the memory cells of the bank in response to a first read command input from the external controller, perform a write operation of storing data in memory cells corresponding to a second address among the memory cells of the bank in response to a write command received from the external controller, the memory cells corresponding to the second address sharing the bit lines with the memory cells corresponding to the first address, and control the read buffer to provide, when an address corresponding to a second read command input from the external controller after performing the write operation matches the first address, the result of the read operation, stored in the read buffer, to the external controller as a response to the second read command.

2. The memory device according to claim 1, wherein the operation controller further comprises:

an address storage configured to store an address for which the read operation is completed.

3. The memory device according to claim 2, wherein the command processor is configured to control the bank buffer to discard data stored in the write buffer in response to the write command.

4. The memory device according to claim 2, wherein the command processor is configured to control the bank buffer to discard data stored in the read buffer when the address corresponding to the second read command mismatches the first address.

5. The memory device according to claim 4, wherein the command processor is configured to:

control the read buffer to store a result of a read operation performed on the memory cells corresponding to the address corresponding to the second read command; and store the address corresponding to the second read command in the address storage.

6. The memory device according to claim 2, wherein the command processor is configured to control the read buffer to output data stored in the read buffer as the response to the second read command when the address corresponding to the second read command matches the first address.

7. The memory device according to claim 2, wherein the command processor is configured to skip a read operation corresponding to the second read command when the address corresponding to the second read command matches the first address.

8. The memory device according to claim 2, wherein the command processor is configured to retain data stored in the read buffer when the address corresponding to the second read command matches the first address.

9. The memory device according to claim 1, wherein the operation controller, during the read operation, is configured to:

apply a negative voltage to a word line connected in common to the memory cells corresponding to the first address; and apply a positive voltage to the bit lines.

10. The memory device according to claim 1, wherein each of the memory cells of the bank contains an amorphous chalcogenide-based material.

11. A memory device comprising:

a bank including memory cells each having one of a set state or a reset state;

a word line controller configured to control a plurality of word lines connected to the memory cells of the bank;

a bit line controller including a bank buffer connected to the memory cells of the bank through a plurality of bit lines; and an operation controller configured to control the memory cells of the bank, the word line controller, and the bit line controller in response to a command received from an external controller, wherein the bank buffer comprises:

a read buffer including read data latches connected to the plurality of bit lines, respectively; and a write buffer including write data latches connected to the plurality of bit lines in common with the read data latches, wherein the operation controller comprises:

a command processor configured to process the command received from the external controller; and an address storage configured to store an address for which a read operation is completed, wherein the command processor is configured to control the read buffer to:

store a result of a read operation performed on memory cells corresponding to a first address among the memory cells of the bank in response to a first read command input from the external controller; and retain data stored in the read buffer while performing a write operation of storing data in memory cells corresponding to a second address among the memory cells of the bank, in response to a write command received from the external controller, the memory cells corresponding to the second address sharing the bit lines with the memory cells corresponding to the first address.

12. The memory device according to claim 11, wherein the operation controller, during a read operation on memory cells among the memory cells of the bank, is configured to:

apply a negative voltage to a word line connected in common to memory cells corresponding to a read target address; and apply a positive voltage to the plurality of bit lines.

13. The memory device according to claim 11, wherein the operation controller, during a write operation of writing the set state to memory cells among the memory cells, is configured to:

apply a negative voltage to a word line connected in common to memory cells corresponding to a write target address; and apply a positive voltage to the plurality of bit lines.

14. The memory device according to claim 11, wherein the operation controller, during a write operation of writing the reset state to memory cells among the memory cells, is configured to:

apply a positive voltage to a word line connected in common to memory cells corresponding to a write target address; and apply a negative voltage to the plurality of bit lines.

15. The memory device according to claim 11, wherein the command processor is configured to store the first address in the address storage.

16. The memory device according to claim 15, wherein the command processor is configured to control the read buffer to output the data stored in the read buffer as a response to the second read command when an address corresponding to a second read command input after performing the write operation matches the first address.

17. The memory device according to claim 15, wherein, when an address corresponding to a second read command input after performing the write operation mismatches the first address, the command processor is configured to:

control the read buffer to discard data stored in the read buffer; and perform a read operation of sensing the data stored at the address corresponding to the second read command.

18. The memory device according to claim 11, wherein each of the memory cells of the bank contains an amorphous chalcogenide-based material.

* * * * *